United States Patent
Rydnell et al.

(10) Patent No.: US 6,665,307 B1
(45) Date of Patent: Dec. 16, 2003

(54) VARIABLE FAST PAGE MODE

(75) Inventors: Gunnar Rydnell, Rävlanda (SE); Jan Lindskog, Pixbo (SE); Timo Pohjanvuori, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/347,023

(22) Filed: Jul. 2, 1999

(51) Int. Cl.[7] .................................................. H04J 3/16
(52) U.S. Cl. ........................ 370/437; 370/445; 370/447; 370/321; 370/347; 455/452.1; 455/509
(58) Field of Search ................................. 455/574, 510, 455/517, 135, 134, 652.1, 502, 509; 370/445, 447, 346, 347, 350, 321, 337, 437

(56) References Cited

U.S. PATENT DOCUMENTS

| | | | |
|---|---|---|---|
| 5,539,748 A | | 7/1996 | Raith |
| 5,555,266 A | * | 9/1996 | Buchholz et al. ............ 370/347 |
| 5,638,371 A | * | 6/1997 | Raychaudhuri et al. .. 370/310.2 |
| 5,673,259 A | | 9/1997 | Quick, Jr. |
| 5,708,656 A | | 1/1998 | Noneman et al. |
| 5,729,541 A | * | 3/1998 | Hamalainen et al. ....... 370/337 |
| 5,806,007 A | | 9/1998 | Andersson et al. |
| 5,991,286 A | * | 11/1999 | Labonte et al. ............. 370/337 |
| 6,041,048 A | * | 3/2000 | Erickson et al. ............ 370/328 |
| 6,058,289 A | * | 5/2000 | Gardner et al. |
| 6,094,426 A | * | 7/2000 | Honkasalo et al. ......... 370/331 |
| 6,094,429 A | * | 7/2000 | Blanchette et al. ......... 370/337 |
| 6,219,343 B1 | * | 4/2001 | Honkasalo et al. ......... 370/335 |
| 6,310,866 B1 | * | 10/2001 | Kronestedt et al. ......... 370/330 |
| 6,359,877 B1 | * | 3/2002 | Rathonyi et al. ............ 370/232 |
| 6,370,359 B1 | * | 4/2002 | Ue et al. ..................... 455/522 |

FOREIGN PATENT DOCUMENTS

| | | |
|---|---|---|
| EP | 0872982 A1 | 10/1998 |
| WO | WO97/35704 | 10/1997 |

* cited by examiner

*Primary Examiner*—Edward F. Urban
*Assistant Examiner*—Sonny Trinh

(57) ABSTRACT

The present invention provides a method and system for reducing the delay of the transmission of packet data including receiving data from a network via a base station and assigning a mobile station to a packet channel having an active mode and a variable fast page mode. Packet data is exchanged in the active mode until a first inactivity timer expires. The base station and mobile station are then switched to a variable fast page mode in which additional packet data can be exchanged, wherein the variable fast page mode has a greater delay between transmission opportunities than the active mode. The variable fast page mode schedules specific time slots which are monitored for the transmission and receipt of successive packets. In addition, the periodicity of future time slots can vary based on the delay between the successive packets. The mobile station remains in variable fast page mode until the expiration of a second inactivity timer or at the reception of a transmission opportunity and subsequent data transfer to or from the mobile station.

16 Claims, 5 Drawing Sheets

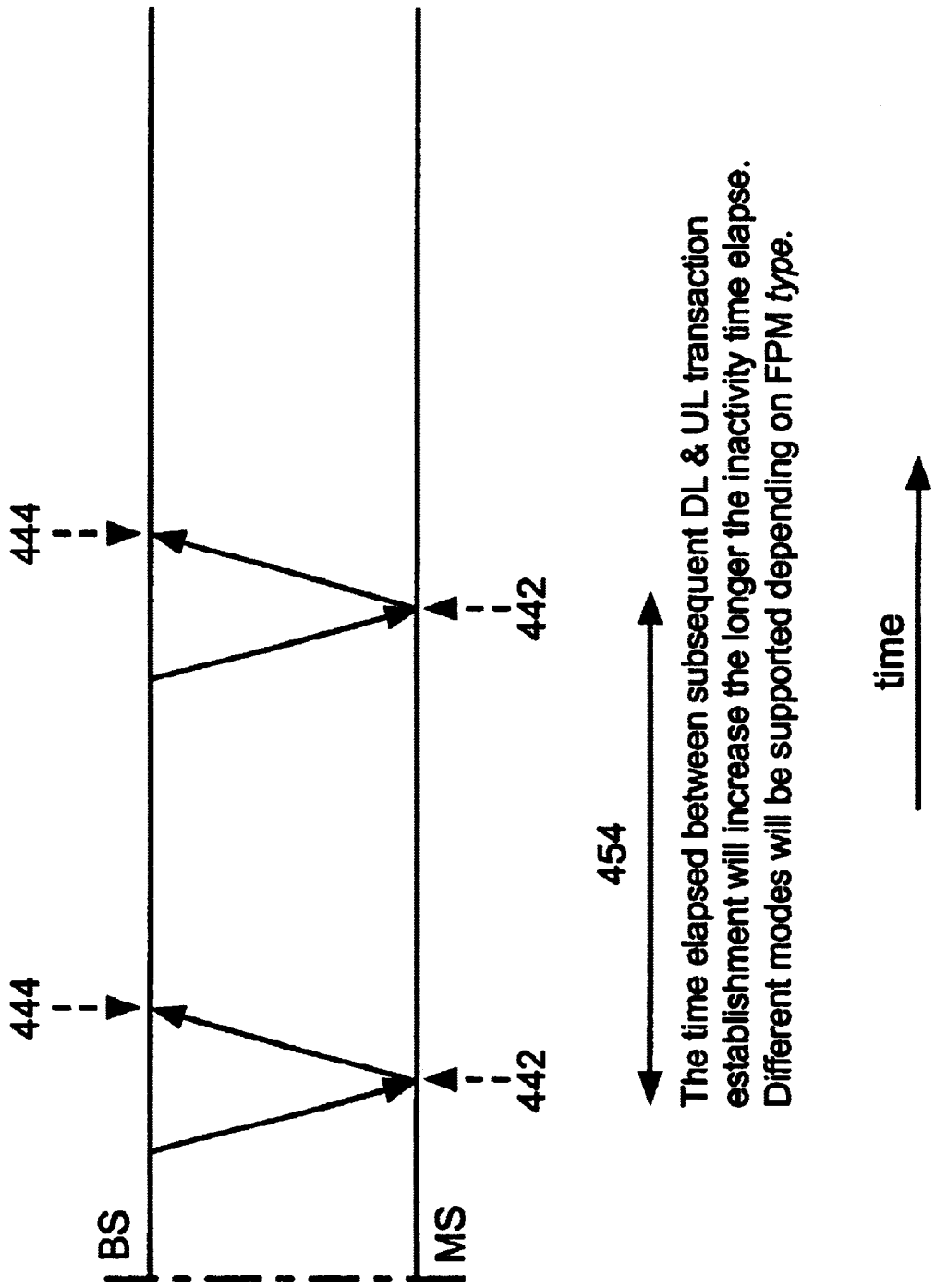

VARIABLE FAST PAGE MODE

RELATED APPLICATION

This application is related to U.S. patent application Ser. No. 09/347,022, filed on even date herewith, the entire contents of which are herein incorporated by reference.

BACKGROUND

The present invention relates generally to radiocommunication systems and, more particularly, to techniques and structures for allowing a mobile telephone to quickly establish an uplink and downlink Medium Access Control transaction.

The growth of commercial communication systems and, in particular, the explosive growth of cellular radiotelephone systems worldwide, has compelled system designers to search for ways to increase system capacity and flexibility without reducing communication quality beyond consumer tolerance thresholds. Mobile calls for example, may be routed in a circuit switched fashion, a packet switched fashion, or some hybrid thereof. It has become increasingly desirable to couple and to integrate mobile cellular telephone networks, for instance a GSM network, to Internet protocol (IP) networks for call routing purposes. The routing of voice calls over IP networks is frequently termed "voice over IP" or, more succinctly, VoIP.

Packet-switched technology, which may be connection-oriented (e.g., X.25) or "connectionless" as in IP, does not require the set-up and tear-down of a physical connection, which is in marked contrast to circuit-switched technology. This reduces the data latency and increases the efficiency of a channel in handling relatively short, bursty, or interactive transactions. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers," stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

FIG. 1A shows representative architecture used for communicating across an air link that comprises the packet data protocols which provide connectivity between a mobile end system (M-ES), a mobile data base station (MDBS), and a mobile data intermediate system (MD-IS). An exemplary description of the elements in FIG. 1A and an approach for each element when considering alternative RF technologies follows.

The Internet Protocol/Connectionless Network Protocol (IP/CLNP) are network protocols that are connectionless and widely supported throughout the traditional data network community. These protocols are independent of the physical layer and preferably are not modified as the RF technologies change.

The Security Management Protocol (SMP) provides security services across the air link interface. The services furnished include data link confidentiality, M-ES authentication, key management, access control, and algorithm upgradability/replacement. The SMP should remain unchanged when implementing alternative RF technologies.

The Radio Resource Management Protocol (RRMP) provides management and control over the mobile unit's use of the RF resources. The RRMP and its associated procedures are specific to the AMPS RF infrastructure and require change based on the RF technology implemented.

The Mobile Network Registration Protocol (MNRP) is used in tandem with a Mobile Network Location Protocol (MNLP) to allow proper registration and authentication of the mobile end system. The MNRP should be unchanged when using alternative RF technologies.

The Mobile Data Link Protocol (MDLP) provides efficient data transfer between the MD-IS and the M-ES. The MDLP supports efficient mobile system movement, mobile system power conservation, RF channel resources sharing, and efficient error recovery. The MDLP should be unchanged when using alternative RF technologies.

The Medium Access Control (MAC) protocol and associated procedures control the methodology M-ESs use to manage shared access to the RF channel. This protocol and its functionality is supplied by alternative RF technologies.

Evolving packet data systems which use the aforementioned protocols will likely support two types of RF channels for packet data transmissions: a packet control channel (PCCH) and a packet traffic channel (PTCH). The PCCH may be either a point-to-point or point-to-multipoint channel. It is this channel on which a mobile station camps (i.e., where the mobile reads broadcast and paging information and where the mobile has random access and reserved access opportunities). The PTCH, on the other hand, is a point-to-point, reserved access only, channel. As will be appreciated by those skilled in the art, an RF channel can provide either packet data services or voice services or can simultaneously provide both packet data and voice services.

FIG. 1B illustrates a state diagram for a conventional mobile station operating, for example, in the protocol architecture illustrated in FIG. 1A. Upon activation, a mobile station selects a PCCH on which to camp. If multiple PCCHs exist in a cell, then the mobile station selects one depending, for example, on the mobile station's identification. For instance, if the least significant bit of the mobile station's identification is 00, the mobile station will choose one PCCH; if the least significant bit is 01, it will choose another PCCH, etc. By selecting a PCCH in the above-described manner, paging traffic is spread out over the available PCCHs.

Upon a contention-based access from the mobile station, for the transmission of uplink data, or upon receiving mobile termination data from the network, for the transmission of downlink data, the network (via a base station) may direct the mobile station to tune to a specific PTCH for the establishment of a MAC transaction, e.g., a session for packet transmission. Once on a PTCH, the mobile station enters an active mode 101 and the network schedules resources for the specific mobile to complete the MAC transaction in a reserved access mode.

When the mobile has completed the MAC transaction and a configurable inactivity timer, typically residing in the mobile station, expires (generally after 1 second of inactivity), the mobile station leaves the reserved access mode of the PTCH and returns to camp on the original PCCH and eventually enters a sleep-mode 103. When the mobile station is in a sleep-mode, the mobile station conserves battery life by periodically turning off, and then on, the power of its transceiver such that the PCCH is monitored on a periodic, and not constant, basis.

Upon the reception of additional downlink data from the network, if the mobile station has entered a sleep-mode, the base station will page the mobile station at a designated time slot in order to start a downlink MAC transaction. Alternatively, if the mobile station is not in a sleep-mode, i.e., is still active on the PTCH, the base station will start the MAC transaction at the next available reserved time slot.

Certain user services, e.g., VoIP, include sensitive time constraints over the reserved access channel. That is, delays in the transmission and/or receipt of successive packets can have noticeable and undesirable quality of service (QoS) effects, e.g., on voice quality.

For uplink MAC transactions, the delays in between successive packets can be caused by the mobile station having to wait for the next contention based access opportunity scheduled from the base station. The mobile station must also wait for the response of a requested contention based uplink access until it can utilize all of its capabilities. In addition, collisions may occur upon the contention based access opportunities. That is, if multiple mobile stations try to send MAC requests simultaneously, at least one of the mobiles will cease their request and delay until the next contention based opportunity. This cease and delay procure creates an unpredictable variance in the delay for successive MAC transactions.

For conventional downlink MAC transactions, the inactivity timer can force the mobile station to exit active mode 101 and enter sleep-mode 103. If the time since the last uplink or downlink activity occurred exceeds a predetermined value, i.e., the inactivity timer expires, then the mobile station will enter sleep mode and only monitor certain paging time slots in the superframe phase given by its identity. Once the mobile station enters sleep-mode, the delay until a downlink MAC transaction can be established depends on the time until the next paging opportunity. This delay can be partly avoided by increasing the length of the inactivity timer prior to the initiation of sleep mode. While this technique will reduce the delay between successive packets, it will also increase the rate of battery consumption during the times when the mobile station is receiving non-time critical applications. Furthermore, the demands on bandwidth will be increased which may reduce the capacity of the base station.

At the creation of the uplink MAC transaction, the operator can configure the MAC so that most uplink MAC transactions are created as unbounded transactions. That is, more data from the mobile station application can be added to extend the existing transaction. However, once the data from the mobile station transmit buffers has decreased under a predetermined value, the transaction can no longer be extended. For delay sensitive applications, or premium end-users who desire a high QoS, the delay probabilities described above will influence the next uplink data that needs to be sent.

Therefore, there is a need for a system and method which can mitigate the effects of contention based delay for uplink data taking into account the collision probability and variances in delay. In addition, there is a need for a system and method which overcomes the paging delay for downlink data while still providing a reasonable battery preservation technique without sacrificing delay response time.

For other conventional systems, such as a wireless local area network (WLAN), sleep-mode is used in order to minimize battery consumption by the wireless terminal adapter of the mobile station. However, due to long reactivation times for the entrance and termination of the sleep-mode, the use of sleep-mode may introduce unacceptable delays for real-time applications such as VoIP. The delays for the mobile station are mostly due to collision probability while the delays for the network base stations are mostly due to the paging delays, as well as delays for the required signaling over the air interface prior to the entrance and exit of the sleep-mode. Thus, there exists a need to minimize the battery consumption by a mobile station during real-time applications while also minimizing delay response times.

SUMMARY

The present invention overcomes the above-identified deficiencies in the art by providing a method and system for reducing the delay of the transmission of packet data including receiving data from a network via a base station and assigning a mobile station to a packet channel having an active mode and a variable fast page mode. Packet data is exchanged in the active mode until a first inactivity timer expires. The base station and mobile station are then switched to a variable fast page mode in which additional packet data can be exchanged, wherein the variable fast page mode has a greater delay between transmission opportunities than the active mode. The variable fast page mode schedules specific time slots which are monitored for the transmission and receipt of successive packets. In addition, the periodicity of future time slots can vary based on the delay between the successive packets. The mobile station remains in variable fast page mode until the expiration of a second inactivity timer or at the reception of a transmission opportunity and subsequent data transfer to or from the mobile station.

BRIEF DESCRIPTION OF THE DRAWINGS

The above objects and features of the present invention will be more apparent from the following description of the preferred embodiments with reference to the accompanying drawings, wherein:

FIGS. 4A and 4B illustrate a signal and timing diagram of an exemplary embodiment of the present invention.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

The exemplary radio communication systems discussed herein are described as using the time division multiple access (TDMA) protocol, in which communication between the base station and the mobile terminals is performed over a number of time slots. However, those skilled in the art will appreciate that the concepts disclosed herein find use in other protocols, including, but not limited to, frequency division multiple access (FDMA), code division multiple access (CDMA), time division duplex (TDD), or some hybrid of any of the above protocols.

Figure 1A:
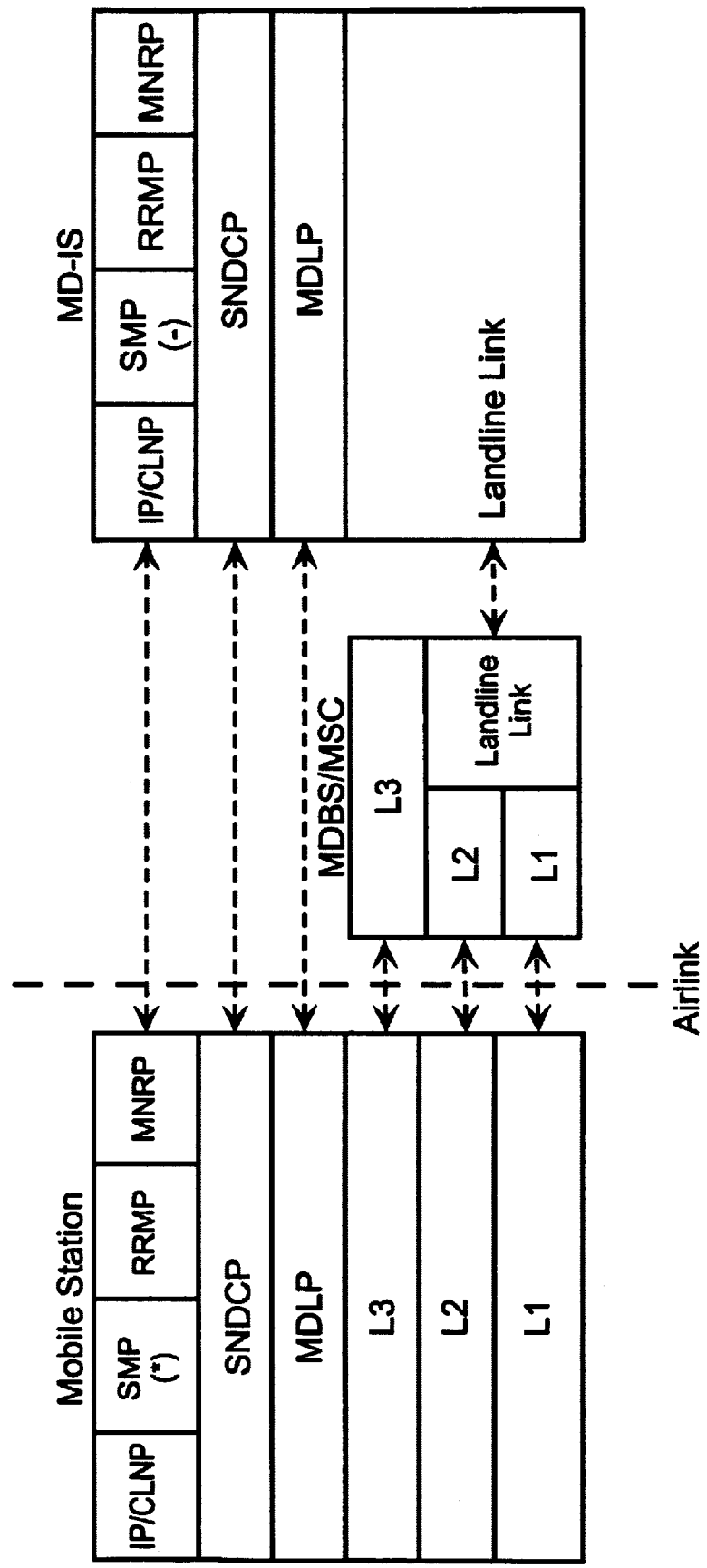
FIG. 1A illustrates a protocol architecture for communicating across an air link.
Figure 1B:
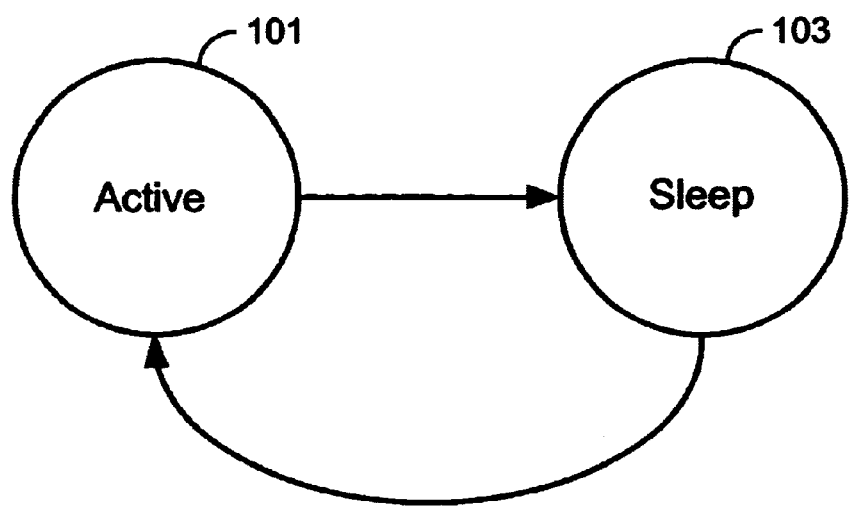
FIG. 1B illustrates a state diagram for a conventional mobile station.
Figure 2:
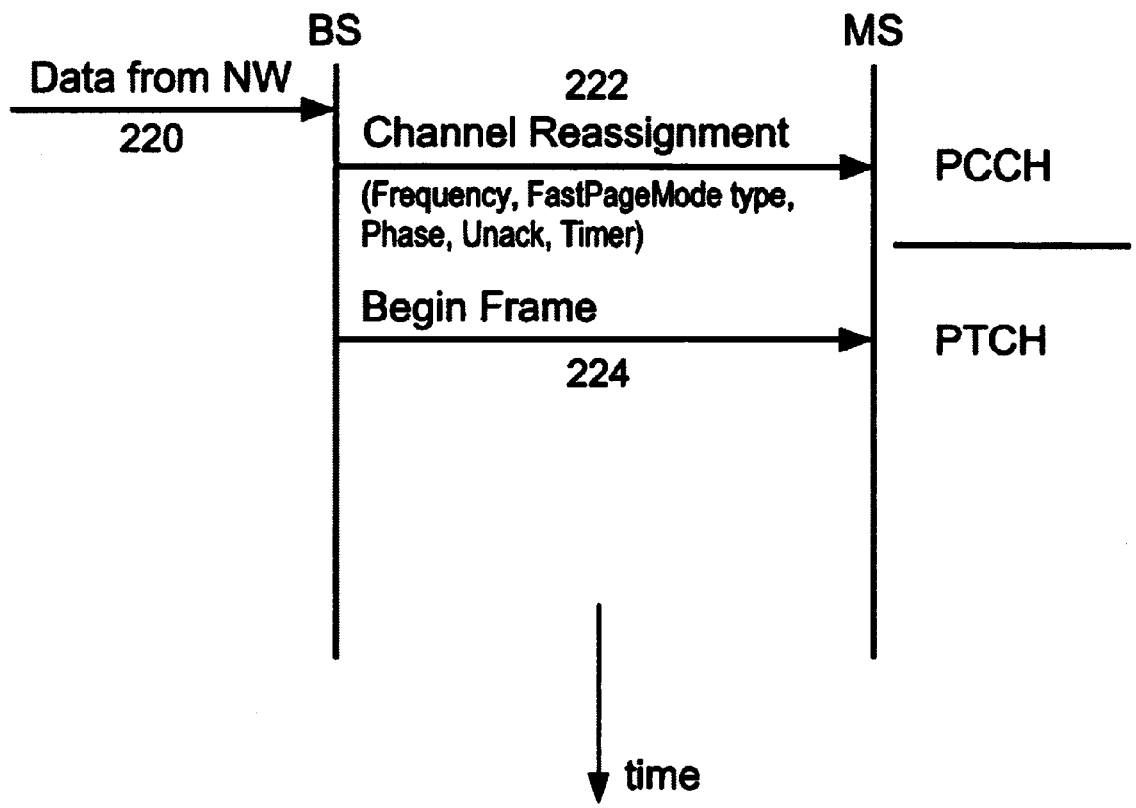
FIG. 2 shows an exemplary signal diagram between a base station and a mobile station of the present invention.

FIG. 2 shows an exemplary signaling diagram between a base station and a mobile station of the present invention. The base station receives data designated for a transmission to a mobile station which includes hard time constraints 220. In an exemplary embodiment of the present invention, the base station or the mobile station determines the hard time constraint for the data designated to the mobile station based upon the service access point (SAP) data which is received from a higher layer, e.g., Layer 1, or additional data which is attached to the data designated to the mobile station. Alternatively, a router, or other lower layer bearer, detects the type of data designated for a transmission and informs the base station, if necessary, of a hard time constraint.

The base station then establishes a MAC transaction by sending a Channel Reassignment message 222 on the PCCH ordering the mobile station to tune to the PTCH. Alternatively, the MAC transaction may occur on the PCCH depending on the traffic load on the PTCH and amount of data designated for the transmission. In this example, the decision to remain of the PCCH for the MAC transaction is made by the scheduling function in the base station. The Channel Reassignment message 222 includes: (1) the frequency of the PTCH; (2) the type of FPM to be used; (3) the phase, i.e. which time slot to use; (4) whether to enter an unacknowledged or acknowledged mode; and (5) an FPM inactivity timer value ($T_2$). The type of fast page mode (FPM) used by the base station refers to the initial periodicity of the uplink and downlink MAC transaction opportunities for the mobile station receiving the Reassignment message. The FPM type also provides the mobile station with information, either explicitly or implicitly, regarding the manner in which the periodicity of transmit opportunities varies as a function of the inactivity time after the latest receipt/transmission of packets. Those skilled in the art will appreciate that there are a number of ways in which this scheme can be implemented. For example, the FPM field in the Reassignment message could have a value of 1–4. Each of these values could be mapped to a storage area within the mobile station which contains both an initial periodicity and a formula or look-up table for calculating the variable periodicity as a function of inactivity time. In addition, those skilled in the art will appreciate that messages other than the Reassignment message may be used to inform the mobile of the FPM characteristics. The message may be appended to an existing message transmitted to the mobile station or the message may be sent explicitly.

Figure 3:
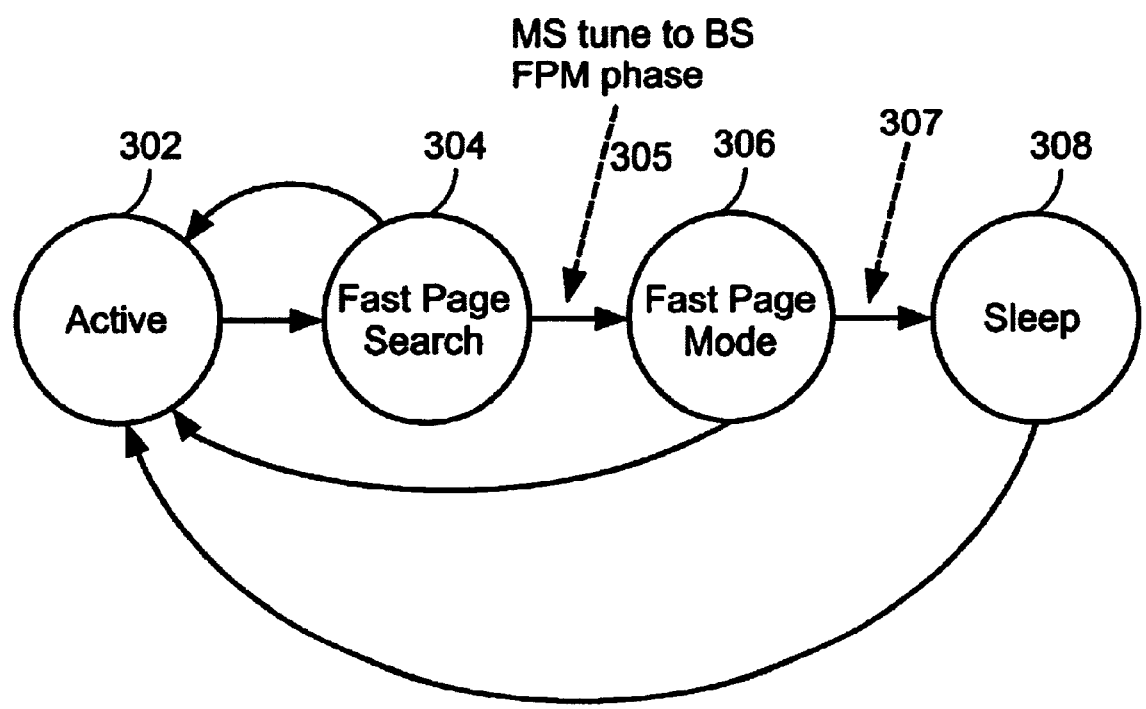
FIG. 3 illustrates a state diagram for a mobile station for an exemplary embodiment of the present invention.

FIG. 3 illustrates a state diagram for a mobile station for an exemplary embodiment of the present invention. Upon receiving the Reassignment message, including an FPM type, that indicates a request to establish a MAC transaction based either on uplink data from the mobile station or downlink data from the network with a quality of service (QoS) which has a hard time constraint, e.g., which is delay sensitive, the mobile station enters an active mode 302. In this exemplary embodiment, during the active mode 302, the mobile station is tuned to the Packet Traffic Channel (PTCH) to send and/or receive packet data. At the expiration of a first inactivity timer ($T_1$), e.g., after one second of inactivity, the mobile station remains on the PTCH and seeks to enter the FPM 306.

In order to ensure that the mobile station and the base station are synchronized in fast page mode, a fast page search mode 304 is initiated prior to entering the FPM state 306. The mobile station monitors the downlink data when in fast page search mode in order to synchronize to the base station FPM phase. An exemplary method for synchronizing the mobile station FPM with the base station FPM is to require the mobile station to detect a predetermined number of FPM downlink signals sent by the base station. Another exemplary method for synchronizing the mobile station FPM with the base station FPM is to explicitly code an FPM identifier into the downlink frame transmitted by the base station. Then, when the mobile station reads the FPM identifier in a downlink burst associated with its FPM type, it will have synchronized to the base station.

Once the mobile station synchronizes to the base station's FPM phase, the mobile station enters the FPM state 306. For fast page search mode 304, if the mobile station has uplink data to send to the base station or if the mobile station detects data destined to the mobile station, then the mobile station is returned to the active mode 302. In FPM 308, once the base station has scheduled the mobile station for a MAC transaction, the mobile station is also returned to active mode 302.

During the FPM state, the mobile station monitors the downlink time slot with a predetermined variable periodicity as indicated by the FPM type. The base station can then send pending downlink data (if any exists) to the mobile station on the predetermined time slots without the need for time-consuming page procedures for the establishment of a MAC transaction. The mobile station monitors the predetermined FPM time slots in order to receive the downlink data from the base station. The base station utilizes the same predetermined variable periodicity as the mobile station and will schedule the mobile station for uplink data transactions without the need for contention based access attempts of the mobile station for the establishment of a MAC transaction. The mobile station can establish subsequent MAC transactions by simply sending a Begin frame during the predetermined time slot which it will identify using the variable periodicity indicated by its assigned FPM type and the measured inactivity. Once either an uplink or downlink MAC transaction is established, the mobile station returns to the active mode 302.

While the mobile station is in FPM 306, if the FPM inactivity timer ($T_2$) expires 307, e.g., after 30 seconds, then the mobile station will enter a conventional sleep-mode 308. During sleep-mode 308, if the mobile station detects a request to establish a MAC transaction based either upon uplink data from the mobile station or downlink data from the network, then the mobile station will re-enter the active mode 302.

In an alternate embodiment of the present invention, the mobile station requests FPM operation from the base station via explicit signaling that is sent, for example, after a predetermined period of inactivity following a MAC transaction. In the FPM request, the mobile station may include FPM parameters, e.g., the type of FPM, and/or a requested uplink opportunity quantity. In this alternate embodiment, the base station acknowledges the FPM request and, if available, starts sending transmission opportunity indications to the mobile station in FPM.

Figure 4A:
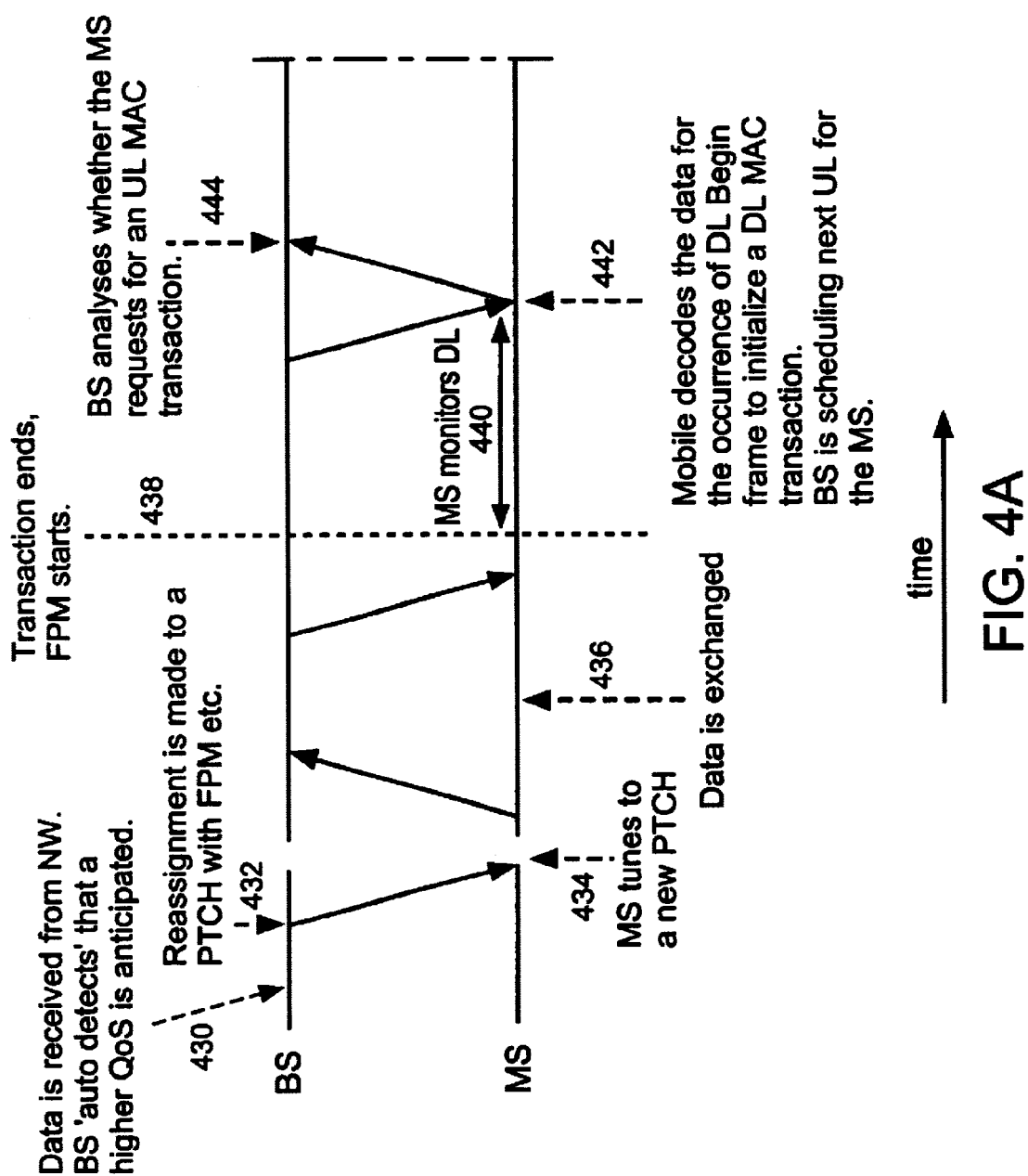

To further explain the concepts associated with the present invention, FIGS. 4A and 4B illustrate a signal and timing diagram of an exemplary embodiment of the present invention. With respect to the downlink operation of a base station and mobile station of the present invention, data is received from the network and the base station detects that a high QoS is expected at 430. The base station reassigns the mobile station to a PTCH by transmitting the aforedescribed Reassignment message at 432 including an indication of the FPM type to be used by the base station and mobile station. The mobile station, in response to the reassignment message from the base station, tunes to the PTCH 434. Downlink data and uplink data (if present) is exchanged at 436 according to the reservation schedule of the MAC transaction. After the last transmission of the MAC session, the first inactivity timer ($T_1$) is started. If no more data is transmitted, the first inactivity timer expires and FPM begins at 438. The mobile station synchronizes to the base station's FPM and monitors the predetermined time slots for downlink data 440. When downlink data is present, the mobile station detects a downlink Begin frame which initializes a downlink MAC transaction. Meanwhile, the base station schedules an uplink for the mobile station regardless of whether or not the mobile station will use the uplink time slot. At the designated time slot, the base station determines whether or not the mobile station has sent an uplink Begin frame for an uplink MAC transaction.

Referring now to FIG. 4B, downlink and uplink opportunities 442 and 444 are repeated as long as the FPM inactivity timer ($T_2$) does not expire, at which time the mobile station enters a sleep-mode. In an exemplary embodiment of the present invention, the periodicity (represented by 454) between successive transactions increases with the elapsed inactivity time. When the mobile station was informed of the type of FPM, the mobile station received information which described the different periodicity levels supported by the base station with respect to elapsed FPM inactivity time. That is, once the FPM begins, the periodicity of the downlink and uplink transactions opportunities will vary based on the duration of inactivity between successive transactions. Furthermore, since the type of FPM is communicated to the mobile station from the base station prior to the initiation of the FPM, the mobile station can anticipate the changes in periodicity without further instructions from the base station.

By varying the delay while in FPM, mobile stations requiring higher QoS can receive signals with higher QoS while conserving battery power. This is due, in part, because the mobile station is not required to remain in the active mode to receive a higher QoS. In addition, the present invention utilizes a shared packet data channel for both non-delay sensitive as well as delay sensitive services. Since the variable FPM reserves specific time slots for the mobile station, the variance in delay and paging delay problems in conventional systems is overcome. It is noted that as the time between transmission opportunities increases, the delay in resuming a MAC transaction may also increase. However, user perception of the effects caused by an increase in delay is typically inversely related to the duration of the inactivity. Furthermore, the likelihood of the need for additional transactions is also inversely related to the duration of the inactivity.

The foregoing has described the principles, preferred embodiments and modes of operation of the present invention. However, the invention should not be construed as being limited to the particular embodiments discussed above. While the above-described embodiments were provided using TDMA, one skilled in the art will appreciate that the present invention may be practiced in any of a number of different protocols such as CDMA, FDMA, TDD, etc. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A method for reducing the delay of the radio transmission of packet data comprising:
   receiving data for transmission between a mobile station and a base station;
   assigning said mobile station to a packet channel;
   reserving a plurality of first transmission opportunities for said mobile station in a first mode;
   exchanging data between said mobile station and said base station during at least one of said plurality of first transmission opportunities in said first mode;
   starting a timer after said exchanging of data with said mobile station;
   reserving a plurality of second transmission opportunities for said mobile station in a second mode when said timer exceeds a threshold value; and
   monitoring said plurality of second transmission opportunities for the detection of transmitted additional data;
   wherein said second mode has a greater delay between successive transmission opportunities than said first mode.

2. The method of claim 1, wherein said data is transmitted on an uplink channel.

3. The method of claim 1, wherein said data is transmitted on a downlink channel.

4. The method of claim 1, wherein said reserving said plurality of second transmission opportunities step includes scheduling at least one time slot for each of said plurality of said second transmission opportunities in said second mode.

5. The method of claim 1, wherein said reserving said plurality of said first transmission opportunities step includes scheduling at least one time slot for each of said plurality of said first transmission opportunities in said first mode.

6. The method of claim 4, wherein a periodicity of said scheduled at least one time slot is variable.

7. The method of claim 1, wherein said assigning step assigns said mobile station to said packet channel with a message indicating a type associated with said second mode if a quality of service level from said data exceeds a threshold level.

8. The method of claim 1, wherein said first mode is an active mode and said second mode is a fast page mode.

9. The method of claim 5, wherein said second mode is a variable fast page mode.

10. The method of claim 1, further comprising:
    reserving at least one third transmission opportunity in said first mode based on said monitoring step detecting transmitted additional data.

11. The method of claim 10, wherein said additional data is exchanged between said mobile station and said base station in said at least one third transmission opportunity.

12. The method of claim 1, said method further comprising:
    starting a second timer after said entering of said second move; and
    exiting said second mode when said second timer exceeds a second threshold value.

13. The method of claim 12, wherein said exiting step exits to a sleep node.

14. A method for reducing the delay of the transmission of packet data comprising:
    starting a timer after the receipt of packet data;
    entering a fast page mode when said timer exceeds a first threshold value;
    starting a second timer after said entering of said fast page mode; and
    exiting said fast page mode when said second timer exceeds a second threshold value.

15. The method of claim 14, wherein said exiting step exits to a sleep node.

16. The method of claim 14, wherein said fast page mode provides said mobile station with reserved access to air interface resources having a variable periodicity.

* * * * *